Patented Apr. 9, 1946

2,398,284

UNITED STATES PATENT OFFICE 2,398,284

FILTERS

Southwick W. Briggs, Washington, D. C.

No Drawing. Application January 25, 1941,
Serial No. 375,994

13 Claims. (Cl. 210—203)

This invention relates to filters, and more particularly relates to a filtering material for oils, especially lubricating oils. I have found that materials which possess the same general, or visual, physical characteristics may vary appreciably in their capacities to filter foreign matter from oils. For instance, I have discovered that there are marked differences in the filtering efficiency of various sawdusts and wood fibers which offhand have the same general characteristics. I have also found that the filtering capacity of various other products may be greatly improved by treating the material with certain compounds.

My study to date, therefore, indicates that the ability of a material to filter foreign matter from oils is a function of the surface condition of such material, and that the filtering properties of any given material may be enhanced by coating the same with certain compounds.

For instance, I find that cypress sawdust, cedar sawdust, redwood sawdust, red oak sawdust, locust sawdust, and fibers of such woods, such as, for instance, ground or steam exploded fibers, possess decided superiority as a filtering medium to the sawdusts or fibers of such woods as yellow pine, white pine, red gum, chestnut, poplar and bass wood. It will be appreciated that a casual visual inspection of the above enumerated sawdusts or fibers would fail to demonstrate any marked differences in the physical structure of the same, and hence I am led to the conclusion that the difference in filtering capacity is due to the surface condition of the several products.

I have also found that shredded peanut shells make highly efficient filtering material for crankcase oil, and I believe that it is subject to the same consideration—namely, the surface condition of the material.

As mentioned above, I have further found that the filtering capacity of any given material may be improved by changing its surface condition. For instance, I have found that, by applying to various materials certain metallic soaps of unsaturated fatty acids, such materials may be substantially improved for filtering purposes. As an example, aluminum linoleate may be applied to cellulose wadding, to coat the fibers of the wadding and thereafter oxidize to form a coating insoluble in oil.

Other metals than aluminum, but particularly iron, may serve as the constituent of the soap and other unsaturated acids may be substituted, such as linolenic and eleostearic acids and the like.

Various materials may be coated by the soaps mentioned above, and to enumerate a few such materials, I might mention cotton waste, wood fiber, wood chips, metal wool, slag wool, felt, cloth, yarn (cotton or wool), and filter paper, in addition to the cellulose wadding and sawdusts mentioned above. These and other equivalent materials are embraced within the term "fibrous material" referred to in the claims.

In general, the coating compound is applied at the rate of substantially 1% by weight of the material to be treated. The method of application is optional, but I have found it preferable to dissolve the soap in a suitable solvent, such as one of the aromatic solvents (toluene, for instance) or in turpentine; and then wash the material with such solution. After removing the excess solution, the solvent in that portion of the solution which adheres to the material will evaporate and thereby coat the material with the metallic soap.

It will be appreciated that the coated material may be used in unconsolidated form or may be suitably bonded in such a manner that its filtering efficiency will not be materially impaired. The same consideration applies to the untreated sawdust or fibers of the woods mentioned above as desirable filtering material.

While I have shown and described the preferred embodiment of my invention, I wish it to be understood that I do not confine myself to the precise details herein set forth by way of illustration, as it is apparent that many changes and variations may be made therein, by those skilled in the art, without departing from the spirit of the invention, or exceeding the scope of the appended claims.

I claim:

1. A filter for hydrocarbon oils comprising a bed of soft wood from a group consisting of cypress, cedar and redwood, the selected material being reduced sufficiently in size to greatly increase the surface area, and means for passing oils to be treated through the bed.

2. A filter for hydrocarbon oils comprising a bed composed of chips of a soft wood, selected from a group consisting of cypress, cedar and redwood, and means for passing oils to be treated through the bed.

3. A filter for hydrocarbon oils comprising a bed of sawdust of a soft wood selected from a group consisting of cypress, cedar and redwood, and means for passing oils to be treated through the bed.

4. A filter for hydrocarbon oils comprising a bed of soft wood from a group consisting of cypress, cedar and redwood, the selected material being reduced sufficiently in size to greatly increase the surface area, said surfaces being coated with a salt of an unsaturated fatty acid, and means for passing oils to be treated through the bed.

5. A filter for hydrocarbon oils comprising a bed of soft wood from a group consisting of cypress, cedar and redwood, the selected material being reduced sufficiently in size to greatly increase the surface area, said surfaces being coated with a salt of an unsaturated fatty acid, and said salt constituting approximately 1% by weight of the treated material, and means for passing oils to be treated through the bed.

6. A filter for hydrocarbon oils comprising a bed of soft wood from a group consisting of cypress, cedar and redwood, the selected material being reduced sufficiently in size to greatly increase the surface area, said surfaces being coated with aluminum linoleate, and means for passing oils to be treated through the bed.

7. A filter for hydrocarbon oils comprising a bed of soft wood from a group consisting of cypress, cedar and redwood, the selected material being reduced sufficiently in size to greatly increase the surface area, said surfaces being coated with iron linoleate, and means for passing oils to be treated through the bed.

8. A method of filtering oils comprising passing the oil through a mass of fibrous material the fibers of which are coated with an oil and water insoluble layer of a metal soap of a fatty acid which is solid and substantially non-volatile at the temperature of the oil being filtered.

9. A method of filtering oils comprising passing the oil through a mass of fibrous material the surface of which is coated with aluminum linoleate.

10. A method of filtering oils comprising passing the oil through a mass of fibrous material the surface of which is coated with iron linoleate.

11. A filter for hydrocarbon oils comprising an oil-permeable mass of fibrous material, the fibers of which have a relatively large surface area and are coated with a metallic salt of an unsaturated fatty acid, said salt being insoluble in hydrocarbon oil and water and being solid and substantially non-volatile at the temperature of the oil being filtered, and means to pass the oil to be purified through said mass.

12. A filter for hydrocarbon oils comprising cellulosic wadding, the fibers of which are coated with a metallic salt of an unsaturated fatty acid, said salt being oxidized to render it insoluble in hydrocarbon oil and water and being solid and substantially non-volatile at the temperature of the oil being filtered, and means to pass the oil to be purified through said wadding.

13. A filter for hydrocarbon oils comprising cellulosic wadding, the fibers of which are coated with aluminum linoleate, and means to pass the oil to be purified through said wadding.

SOUTHWICK W. BRIGGS.